Patented Feb. 18, 1941

2,232,554

UNITED STATES PATENT OFFICE 2,232,554

METHOD OF RECOVERING CALCIUM LACTATE AND PRODUCING LACTIC ACID FROM FERMENTED MASHES

John Müller, Philadelphia, Pa.

No Drawing. Application January 20, 1939, Serial No. 251,936

10 Claims. (Cl. 260—527)

The object of this invention is to provide an improved and simplified process for the recovery of lactate, and thereby lactic acid, from such fermented mashes as produce lactic acid either as a primary or secondary product, and to purify lactate from any source whatever.

In the following description, unless otherwise specified, the term lactate is employed to denote any of the several lactates that can be recovered by the new process, as for instance sodium lactate, zinc lactate and calcium lactate, whether from fermented mashes or other sources. As is well known, sodium lactate is the result of sodium carbonate, sodium bicarbonate, sodium hydroxide, or other sodium salt, reacting with the initial lactic acid in the mash; zinc lactate results from the reaction of a zinc salt with the lactic acid of the mash; calcium lactate results from the reaction of calcium carbonate, calcium hydroxide, or other calcium salt, with the lactic acid; and so on. However, as calcium carbonate is usually the least expensive of the salts available for the purpose, it is generally employed in the fermenting mash to control the acidity, with the result that calcium lactate is then produced, and from which secondary product the desired lactic acid of commerce is obtained, and in view of which fact calcium carbonate and calcium lactate are hereinafter stressed, while at the same time they represent all other alkalis and salts to which the process is applicable.

Commercially, the lactic acid is then sold in pure (U. S. P.) liquid form, and also dissolved in water to varying degrees of concentration, such for instance as the well known 22% and the 44% concentrations. However, the background of lactic acid production is quite involved, due to the fact that heretofore in order to produce the U. S. P. standard whey had to be relied upon as the raw material, and the resultant cost has been relatively quite high, while all other forms and concentrations (such as the 22% and the 44% above mentioned), produced from blackstrap molasses as a low-cost raw material, have been characterized by an extremely dark brown, almost blackish, color, that is so persistent that its removal has been impracticable within reasonable cost limits. This discoloration is due to the presence of impurities, among which are certain proteins and a small quantity of caramelized sugar.

An object of the prevent invention, therefore, is to provide a process for the cheap production of pure commercial lactate in crystalline form from molasses, or other source of sugar, and from which lactate crystals any desired concentration of lactic acid can be prepared, by simply dissolving the former in the proper quantity of water or alcohol, and treating the same with sulphuric or other suitable acid. It is also to be understood that the present process produces a product which is absolutely chalk- or snow-white, although it is derived from the same impure, gum laden, blackstrap molasses that heretofore has always contributed such extremely dark discoloration, due to the processes, to which the original cane sap has been subjected during the extraction of the sugars of commerce, and from which processes the blackstrap in reality is a by-product.

Briefly reviewed, lactic acid, the end product, may be obtained by means of various types of organisms by fermentation of various raw materials, but due to its relative cheapness blackstrap is assumed to have been selected as the raw material of the fermentation process, which it is also assumed has been completed when and where the present process commences, the molasses having been fermented with *Lactobacillus delbruckii*, or similar organism. As is well known, during fermentation the acidity of the mash must be controlled, and for this purpose calcium carbonate or similar alkali, such as those above mentioned, is employed. However, while controlling the acidity of the mash and thereby neutralizing the lactic acid initially produced therein, the calcium carbonate, for example, simultaneously causes the formation of calcium lactate, instead of the lactic acid that is primarily desired, while said lactate is mixed with a large proportion of impurities, which as before stated it has heretofore been impossible to completely remove.

Consequently, it becomes necessary to first separate the lactate from the impurities before such intermediate lactate can be transformed into the desired acid, and this separation or purification is accomplished in any one of the ways hereinafter described, by means of selective solvents.

The actual fermentation may be carried out in various ways, but for purposes of illustration reference is made to the fermentation process described in detail by H. R. Stiles and L. M. Pruess under the title "Nutrient Requirements of L. Delbruckii in the Lactic Acid Fermentation of Molasses," Journal of Bacteriology, vol. 36, No. 2, August 1938. In that case, "The cultures, obtained from distiller's malt, were maintained on a 10 percent malt mash, with transfers made every three or four days. Titratable acidity of this seed mash should be the equivalent of at least 15 cc. of 0.1N acid per 10 cc. . . . The inoculant for the final mashes was grown for 24 hours in molasses mash containing 5 percent sugar, with half the usual CaCO₃ (calcium carbonate) and a slight excess of nutrients over those of the final mashes. The latter were seeded with 3 percent of the inoculant. Eight liters of final mash was fermented in a 9.5 liter 'Pyrex' bottle equipped with a mechanical agitator, and also a tube for moderate aeration of the fermenting mash. The theoretical amount of calcium carbonate for the complete neutralization of a 95 percent yield of lactic acid was added at the time the mash was made up. All mashes were steamed for 90 minutes. It was found that an incubation temperature of 50–52° C. was as high as could be used for good yields."

From this and similar processes of fermentation, a mash is obtained in which there is a large proportion of calcium lactate, and frequently an excess of the calcium carbonate used for neutralization purposes.

The present process begins at this point, and may be carried out in any one of four ways, as here set forth:

1. In one variation of the new process, approximately 95% alcohol is added directly to the fermented mash, containing the lactate, and in a quantity substantially equal to the volume of the mash, and the solution then permitted to set without heating in order to crystallize out the lactate. The lactate crystals and solid impurities are then filtered out and together treated to additional similarly strong alcohol, after which the entire mass or solution is raised to the boiling point with constant stirring, thereby causing the lactate to dissolve in the alcohol, from which the caramelized and other undissolved substances can be filtered off. The alcohol-lactate solution is then allowed to cool, thereby causing the lactate to crystallize out in the form of a substantially lighter colored product than heretofore, but one which is not as pure as may be desired for some purposes, yet from which may be derived lactic acid of a quality which is entirely satisfactory for many purposes, as it is purer and of a distinctly lighter color than the usual product of commerce.

The initial extraction of the lactate by this variation of the process is somewhat slow, due to the dilution of the first added alcohol by the large amount of water in the unconcentrated mash. The preliminary separation of the lactate from the impurities of the mash may be accomplished by the use of any one of several solvents, especially one selected from the group which comprises ethyl alcohol, propyl alcohol, isopropyl alcohol, acetone, and probably others, or of any combination of them that may be desirable for specific purposes, or due to extraneous circumstances which may affect their use, as for instance the use of a denatured alcohol comprising, for example, 15% acetone in ethyl alcohol, or sufficient to denature the latter within any governmental requirements which may obtain (such acetone-alcohol solution being considered as an alcohol broadly), while from the lactate thus produced the lactic acid is recovered quantitatively by the use of oxalic or sulphuric acid in well known manner.

The filtrate from the first crystallization will be fairly low in alcoholic strength, but in any case the alcohol may be recovered by distillation. In order to obtain a still lighter colored commercial product, the impure crystals first produced are re-dissolved in a compound solvent comprising alcohol of approximately 85% strength and 15% water, said compound solvent being brought to the boiling point, so as to dissolve the lactate and the soluble impurities, while at the same time releasing and precipitating the insoluble impurities, which are then filtered out, the compound solvent then being cooled so as to crystallize out and precipitate the relatively pure lactate, which is then separated by filtration, after which the alcohol of the compound solvent is recovered by distillation for re-use as desired. For the U. S. P. product, such as is used in the food industry, a third and similar recrystallization may be effected, if necessary or desirable, by means of a similar compound solvent, comprising like the last-mentioned approximately 85% of alcohol and approximately 15% water, after which the resulting product will be found to comprise an absolutely chalk- or snow-white powder, the degree of fineness of the crystallized precipitate being controlled by the degree of agitation (as by means of compressed air) during the cooling of the alcohol-lactate solution, and the alcohol recovered from the last step being water clear and of its original strength, so that it can thereafter be used over and over again without redistillation.

2. In the second variation of the process, the fermented mash is first concentrated by evaporation preferably in a vacuum to one-half or even one-third of its volume, so as to decrease the quantity of water present, and consequently the amount of alcohol that needs to be used. As in the first variation, alcohol of approximately 95% strength and of substantially equal quantity is added to the concentrated mash, and the resultant solution then permitted to set without heating, in order to crystallize out the lactate. The lactate crystals and solid impurities are then filtered out and to them jointly strong alcohol of preferably 95% strength or over is added, the resulting solution boiled and cooled, as in the previous instance, and the lactate crystallized out as before, and recrystallized with an 85%–15% alcohol-water solvent as many times as may be necessary in order to obtain the desired degree of purity and consequent whiteness of the commercial product, as hereinbefore described.

3. In the third variation of the process, the mash is first filtered and then evaporated preferably in a vacuum, until the whole mass becomes solid upon cooling. To the solid mass of lactate, a compound solvent comprising alcohol of preferably not less than approximately 80% strength and 20% water is then added (the slight additional amount of water in the alcohol of somewhat lower strength being desirable) with constant stirring or agitation as by compressed air, while being brought to the boiling point, and until the entire mass of lactate is dissolved, and filtered if necessary, after which said solution is permitted to stand and cool, or such cooling may be hastened by suitable cooling devices, and the lactate crystallized out as before described. The crystals thus formed are of a grayish white color, but by again dissolving them in a compound solvent comprising alcohol of approximately 85% strength and water 15%, and permitting the crystals to again crystallize out as before, a U. S. P. product of the highest purity is obtained. This last variation is, therefore, probably the most rapid, least expensive and productive of the purest product by the least effort.

It is also to be understood that the improved process involves the use of any compound solvent, one phase of which is capable of dissolving the lactate when raised in temperature and subsequently upon cooling precipitating the same, while the other phase dissolves and continues to maintain at least a portion of the impurities in suspension as the lactate precipitation from the first phase proceeds. More specifically, the preferred solvents are those in which the first-mentioned phase acts as a solvent only when heated, as for instance to their respective boiling points, and subsequently upon cooling precipitate out the lactate crystals. Therefore, in the appended claims the term solvent or solvents is intended to include any such solvents as fulfill this requirement, as well as the separation of the impurities from the lactate by dissolving the impurities in the second-mentioned phase, comprising water, or other solvent answering the same purpose, so as to thereby leave the originally impure lactate as initially recovered from the mash in a sufficiently pure form to fill many needs, though for a purer product it may be necessary in each case to thereafter dissolve the lactate in a second compound solvent, as a certain degree of the impurites apparently tends to adhere to the lactate when forming in the mash, to such an extent that mere single separation of the bulk of the impurities from the lactate by water will not suffice.

4. While the process has been described as comprising the addition of alcohol to the mash, in a fourth variation of the process fermented mashes containing a formed lactate can also be added directly to alcohol or other suitable solvent, after first filtering therefrom any excess of calcium carbonate and other non-soluble substances which may be present, and allowed to set without first heating. Likewise, crystallized lactate may be similarly dissolved in water and then added to cold alcohol or equivalent solvent, whereupon the calcium lactate will crystallize out without the solution having first to be heated. However, due to the excess of water in the mash, the impurities which are soluble in water will not separate out, but will remain in solution, thereby necessitating re-crystallization, as hereinbefore described, in order to obtain a substantially or entirely pure commercial lactate and resultant lactic acid, as even upon boiling in such cases the coloring matter remains in solution.

In considering the reference in the foregoing paragraph to the use of an equivalent solvent to cold ethyl, methyl, propyl or isopropyl alcohols, the use of acetone singly in the process is limited to its being used when unheated, that is, when it is at normal atmospheric temperatures, for the reason that its relatively low boiling point prevents its use singly as a solvent for the lactate. Identically as with the use of cold alcohol, acetone can be added in substantially equal volume to the filtered fermented mash with the result that the calcium or other lactate present crystallizes out, as hereinbefore described. However, as acetone, unlike the alcohols, contains no water, lactate crystals upon being filtered off should preferably then be dissolved in water, to which an approximately equal quantity of cold acetone is added, whereupon the lactate again crystallizes out with a much lighter color and resultingly higher degree of purity. Subsequent recrystallization may then be effected, either by this cold acetone method or by the previously described boiling alcohol method, as many times as may be required in order to attain the desired grade of the intermediate and final products, namely, lactate and lactic acid, respectively. After each such recrystallization the acetone, like the alcohol, can be recovered by distillation and thereafter used repeatedly without limit.

On the other hand, the coloring matter will be removed completely by using an alcohol-water mixture of a certain strength, and in this connection there is something of a critical point involved, depending upon the particular purpose for which such compound solvent is intended at any particular step in the process. For instance, if too large a percentage of water is present, impurities are dissolved by the solution, or more specifically, by the water phase of the solvent, even while cold, while if such compound solvent is heated and then allowed to cool, a substantial portion of the water-dissolved impurities adhere to the lactate crystals, which precipitate out of the alcohol phase of the solvent. On the other hand, when the alcohol-water mixture is relatively high in alcohol content, that is well above 85% too large a portion of the lactate remains behind like a molten mass with all of the coloring matter and gums, when such solution is added to the fermented mash, or vice versa. If, however, an alcohol-water mixture of proper strength of approximately 85% is employed and the whole mass is brought to the boiling point, all of the impurities are found to remain undissolved, while the calcium lactate remains in solution as long as the solvent is in the neighborhood of the boiling point. The molten dark brown mass can then be separated from the solvent containing the dissolved lactate, and for this purpose a tank having a conically shaped bottom would be eminently suitable, as facilitating the removal of the precipitated mass of impurities. The clear solution could then remain in such tank for re-crystallization of the lactate.

After the alcohol-water mixture or compound solvent has been employed to recrystallize the lactate, it can be used repeatedly for the same purpose, following each removal of the lactate crystals therefrom, without necessitating redistillation of the alcohol in order to purify the same. In fact, this alcohol-water mixture can be used and re-used as long as the mixture is properly balanced.

The critical points in an alcohol-water compound solvent mixture hereinbefore referred to are substantially defined as follows:

1. To the fermented and filtered mash is added an alcohol-water mixture of a strength not less than 50%–50%, and preferably in the neighborhood of at least 60%–40%, thereby causing impure lactate to crystallize out, the crystallization depending largely upon the concentration of the mash itself, low concentrations being more prolonged, but at the same time being capable of acceleration by the addition of an alcohol mixture of greater strength, while the impurity of the crystallized lactate is due to the presence of a relatively high percentage of water, which dissolves during this step of the process a certain proportion of said impurities.

2. For re-crystallization and purification of the lactate separated from the mash during the first step of the process, an alcohol-water mixture of approximately 75%–25% is effective in precipitating most of such impurities as cause the discoloration of the lactate.

3. If an alcohol-water mixture of approximately 80%-20% is used instead of that last specified, the recrystallized lactate is much lighter in color, but still carries some impurities which remain with and within the crystals.

4. If an alcohol-water mixture of approximately 85%-15% is used, pure white lactate crystals are obtained, leaving in the bottom of the vessel a molten-like dark mass of impurities.

5. If an alcohol-water mixture of approximately 90%-10% and higher strength is used, the dark molten mass formed on the bottom of the vessel will also contain a substantial percentage of lactate, which mass upon being separated must be re-dissolved and purified with substantially the same 85%-15% alcohol-water mixture specified in the last previous paragraph.

From the foregoing it will be seen that if the water-alcohol mixtures are of either too low or too high a strength (as to the proportion of alcohol) difficulties are encountered in endeavoring to obtain a pure lactate product; so that while critical proportions cannot be defined down to the exact percentages of alcohol and water, there are approximately critical percentages, as indicated by the examples herein set forth. It should also be understood that these calculations are all based upon dry calcium lactate, wherefore if the salt is not entirely dry, a proper allowance should be made accordingly, while it may be that the proportions specified will vary to a certain degree in the case of other lactates being recovered and purified by the present process.

Going a step further, instead of purifying and drying the lactate and then producing lactic acid from it, both of these steps may be carried on concurrently. For instance, relatively impure calcium or other lactate may be dissolved in a compound solvent comprising approximately 85% alcohol and 15% water raised to the boiling point, thereby causing the impurities which are insoluble in the alcohol to precipitate out, after a short interval following which precipitation the proper quantity of sulphuric or equivalent acid is added slowly to the hot solution, with the result that the pure lactate dissolved in the alcohol is acted upon, and concentrated lactic acid is directly produced together with calcium sulphate which precipitates out. After this lactic acid and alcohol solution has been filtered to remove the precipitated calcium sulphate and impurities therefrom, or the solution has been drawn off for the same purpose, the compound alcohol-water solvent is distilled and/or evaporated off in well known manner, thus leaving concentrated lactic acid in pure form and substantially or completely undiluted, as may be desired. That is, the lactic acid may be permitted to remain as diluted by the water from the alcohol following distillation of the latter, or this water may be also removed by evaporation, after which the calcium sulphate in either case is removed by filtration, and may be sold as a by-product.

Among the controlling factors of the present process and upon which the principles of operation largely depend are these: (1) The impurities of the fermentation mash are soluble in water and not in pure alcohol; (2) the lactate is soluble in pure alcohol only when raised to the boiling point; (3) both the impurities and the lactate are soluble in a relatively weak alcohol-water mixture, that is, alcohol of a strength of approximately 70% or lower, the impurities being soluble in the approximately 30% water portion of the mixture while yet cold, and the lactate being soluble in the 70% alcohol portion when boiled; (4) that an alcohol-water mixture of approximately 85%-15%, even when boiled, does not take up any of the impurities which remain after a primary separation of impurities from lactate by means of an approximately 60%-40% mixture; (5) that with a mash concentrated to dryness an approximately 80%-20% alcohol-water mixture is required to dissolve the same, in order to provide sufficient water to partially dissolve and release the impurities as well as the lactate, as a preliminary step to subsequent purification of the lactate by re-dissolving the same in an approximately 85%-15% alcohol-water mixture raised to the boiling point and then cooled to cause the desired precipitation of pure lactate; (6) that each of these factors are equally well demonstrated by adding the lactate, either with or without the impurities to the alcohol-water mixtures, instead of adding the said mixtures to them; and (7) that in the purification of the lactate, the same can be dissolved in a boiling alcohol-water mixture of approximately 85%-15% strength, thereby precipitating the insoluble impurities (which can then be filtered off), and after a short interval the proper amount of sulphuric acid (or equivalent acid, such as oxalic) being added slowly to the solution while still heated, so as to thereby react with the lactate to produce lactic acid direct, following which the alcohol can be recovered by simple distillation for subsequent use, in each instance without requiring re-purification. During all steps in the new process both physical and chemical actions are aided by agitation of the mixtures and solutions involved.

Heretofore it has been customary to prepare and ship lactic acid of the desired strength from factory to consumer, in which case freight is paid for the transportation of large quantities of water, which in the case of the low cost 22% lactic acid amounts to no less than 78% of the bulk transported. However, the present process permits the production of the purest form of lactate at such low cost, that it alone can be transported dry, and then converted into lactic acid of the desired strength by the consumer at any desired location, merely by its treatment with the proper proportions of sulphuric or oxalic acid, and the addition of the necessary quantity of water, thereby eliminating the need for using tank cars, greatly lessening the freight cost, and still providing a product of far greater purity per monetary unit, than has heretofore been available.

Having thus described my invention, what I claim as new and desire to protect by Letters Patent of the United States, is:

1. The process of recovering formed lactate of one of the alkaline earth metals from fermented mashes, which produce lactic acid and to which a salt of such a metal has been added to control the acidity, which consists in adding to the mash a solvent comprising water and a member selected from the group consisting of ethyl alcohol, propyl alcohol and isopropyl alcohol, which when raised to the boiling point dissolves the lactate and soluble impurities into the solution and precipitates the insoluble impurities, filtering off precipitated impurities and then cooling the solution to precipitate out the lactate in the form of crystals while leaving the dissolved impurities in solution.

2. The process of recovering formed lactate of one of the alkaline earth metals from fermented mashes, which produce lactic acid and to which a salt of such a metal has been added to control the acidity, which consists in adding to the mash a solvent comprising water and a member selected from the group consisting of ethyl alcohol, propyl alcohol and isopropyl alcohol, which when raised to the boiling point dissolves the lactate and soluble impurities into the solution and precipitates the insoluble impurities, filtering off precipitated impurities and then cooling the solution to precipitate out the lactate in the form of crystals while leaving the dissolved impurities in solution, said lactate solution being agitated while cooling so as to determine the size of the crystals produced.

3. The process of recovering formed calcium lactate from fermented mashes, which produce lactic acid and to which calcium carbonate has been added to control the acidity, which consists in concentrating the mash and then adding a crystallizing agent comprising a member of the group consisting of ethyl, propyl and isopropyl alcohols of 95% concentration or over to the mash, thereby causing the lactate to crystallize out.

4. The process of recovering formed lactate of one of the alkaline earth metals from fermented mashes which produce lactic acid and to which a salt of such a metal has been added to control the acidity, which consists in adding strong unheated alcohol to the mash, and permitting the mash to set, so as to thereby cause the impure lactate to crystallize out, then dissolving the impure lactate crystals in a solvent comprising water and a member selected from the group consisting of ethyl alcohol, propyl alcohol and isopropyl alcohol raised to the boiling point so as to precipitate out any insoluble impurities and simultaneously dissolve the lactate and any soluble impurities present, filtering the solution and permitting the same to cool, so as to thereby cause the purified lactate to crystallize out of the solution in which the soluble impurities remain.

5. The process of recovering formed lactate from fermented mashes which produce lactic acid and to which a salt has been added to control the acidity, which consists in concentrating the mash by evaporation, adding a substantially equal volume of a crystallizing agent comprising a member of the group consisting of ethyl, propyl and isopropyl alcohol and permitting the mash to set, so as to thereby cause the lactate to crystallize out.

6. The process of recovering calcium lactate from fermented mashes which produce lactic acid and to which calcium carbonate has been added to control the acidity, which consists in first treating the mash with strong alcohol and permitting the mash to set, so as to cause the calcium lactate to crystallize out, filtering the mash to separate the calcium lactate therefrom, dissolving said lactate in approximately 85% alcohol and 15% water brought to the boiling point, so as to thereby permit insoluble impurities to precipitate out while soluble impurities go into solution, filtering and then allowing the solution to cool and crystallize out purified lactate, while the soluble impurities remain in solution.

7. The process of recovering calcium lactate from fermented mashes which produce lactic acid and to which calcium carbonate has been added to control the acidity, which consists in evaporating the water from the mash to dryness, adding approximately 80% alcohol and 20% water to the concentrated mash and raising the same to the boiling point to dissolve the lactate and the soluble impurities and precipitate out the insoluble impurities, filtering and then allowing the solution to cool and crystallize out purified lactate.

8. The process of purifying the lactate of an alkaline earth metal, which consists in dissolving the lactate in a solvent, selected from the group consisting of ethyl alcohol, propyl alcohol and isopropyl alcohol raised to the boiling point, and then filtering and permitting the solution to cool, so as to crystallize out the purified lactate.

9. The process of producing lactic acid from a lactate of one of the alkaline earth metals containing impurities which are not soluble in alcohol, which consists in dissolving the impure lactate in a solvent, selected from the group consisting of ethyl alcohol, propyl alcohol and isopropyl alcohol of approximately 85% strength and water raised to the boiling point, thereby permitting the insoluble impurities to precipitate out and soluble impurities to go into solution, filtering off the insoluble impurities, adding sulphuric acid to the filtrate, removing the resulting sulphate by filtration, and then distilling off the alcohol and water to concentrate the free lactic acid therein.

10. The process of producing lactic acid from calcium lactate, which consists in dissolving the lactate in a solvent, selected from the group consisting of ethyl alcohol, propyl alcohol and isopropyl alcohol of approximately 85% strength or higher raised to the boiling point, adding sufficient sulphuric acid to produce lactic acid and calcium sulphate, then removing the calcium sulphate by filtration and distilling off the alcohol to concentrate the free lactic acid therein.

JOHN MÜLLER.